(12) United States Patent
Peters et al.

(10) Patent No.: US 11,867,284 B2
(45) Date of Patent: Jan. 9, 2024

(54) GEARBOX SYSTEM WITH AN AUTOMATED MANUAL GEARBOX

(71) Applicant: Bayerische Motoren Werke Aktiengesellschaft, Munich (DE)

(72) Inventors: Stephan Peters, Vaterstetten (DE); Benjamin Sprengart, Unterschleissheim (DE); Gregor Walla, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 67 days.

(21) Appl. No.: 17/625,932

(22) PCT Filed: May 26, 2020

(86) PCT No.: PCT/EP2020/064602
§ 371 (c)(1),
(2) Date: Jan. 10, 2022

(87) PCT Pub. No.: WO2021/037402
PCT Pub. Date: Mar. 4, 2021

(65) Prior Publication Data
US 2022/0243804 A1 Aug. 4, 2022

(30) Foreign Application Priority Data
Aug. 27, 2019 (DE) .................... 10 2019 122 975.8

(51) Int. Cl.
*F16H 59/02* (2006.01)
*F16H 59/10* (2006.01)
*F16H 63/42* (2006.01)

(52) U.S. Cl.
CPC ..... *F16H 59/0204* (2013.01); *F16H 59/0278* (2013.01); *F16H 59/105* (2013.01);
(Continued)

(58) Field of Classification Search
CPC ............. F16H 59/0204; F16H 59/0278; F16H 59/105; F16H 2059/0239;
(Continued)

(56) References Cited

U.S. PATENT DOCUMENTS

| 5,009,128 A | 4/1991 | Seidel et al. |
| 6,360,624 B1 | 3/2002 | Sedlmaier et al. |

(Continued)

FOREIGN PATENT DOCUMENTS

| CN | 101809333 A | 8/2010 |
| CN | 102271952 A | 12/2011 |

(Continued)

OTHER PUBLICATIONS

"Fahren mit TIPTRONIC | So wirds gemacht", May 12, 2018 (May 12, 2018), [English transcript] [retrieved on Jul. 13, 2023] Retrieved from the Internet: URL:https://www.youtube.com/watch?v=kRdWtOm021E (Year: 2018).*

(Continued)

*Primary Examiner* — Joseph Brown
(74) *Attorney, Agent, or Firm* — Crowell & Moring LLP

(57) ABSTRACT

A gearbox system for a vehicle includes an automated manual gearbox; a gearbox control device which controls the gearbox; a monostable toggle switch which is movable by a user in two deflection directions to select a plurality of driving ranges of the gearbox control device, and a visual device which displays graphically a gearshift diagram with driving ranges selectable by the monostable toggle switch. The gearbox control device has a further driving range which cannot be selected by the monostable toggle switch but can be exited by moving the monostable toggle switch. The visual device has at least one display to display a symbol indicating at least one deflection direction by which the further driving range can be exited. The gearbox control (Continued)

device may control the at least one display such that the symbol is only displayed when the further driving range is selected.

14 Claims, 2 Drawing Sheets

(52) U.S. Cl.
CPC ..... *F16H 63/42* (2013.01); *F16H 2059/0243* (2013.01); *F16H 2059/0247* (2013.01); *F16H 2059/0295* (2013.01)

(58) Field of Classification Search
CPC ..... F16H 2059/0243; F16H 2059/0247; F16H 2059/0295; F16H 63/42
See application file for complete search history.

(56) References Cited

U.S. PATENT DOCUMENTS

| | | |
|---|---|---|
| 2002/0129672 A1 | 9/2002 | Vogel et al. |
| 2011/0219901 A1 | 9/2011 | Giefer et al. |
| 2011/0232408 A1 | 9/2011 | Rampf |
| 2012/0004818 A1* | 1/2012 | Wakita ............... F16H 59/0204 74/473.18 |
| 2014/0216193 A1 | 8/2014 | Lindner et al. |
| 2016/0363213 A1* | 12/2016 | Adames ............. F16H 59/0204 |
| 2017/0167604 A1 | 6/2017 | Song et al. |
| 2017/0261100 A1* | 9/2017 | Wagner ................... F16H 61/22 |
| 2018/0163852 A1* | 6/2018 | Gadola ................ F16H 59/105 |

FOREIGN PATENT DOCUMENTS

| | | |
|---|---|---|
| CN | 103782067 A | 5/2014 |
| CN | 106870722 A | 6/2017 |
| DE | 10 2006 059 992 A1 | 6/2008 |
| DE | 10 2009 039 113 A1 | 3/2011 |
| EP | 0 361 011 A2 | 4/1990 |
| EP | 1 045 172 A2 | 10/2000 |
| JP | 2009-243594 A | 10/2009 |

OTHER PUBLICATIONS

International Search Report (PCT/ISA/210) issued in PCT Application No. PCT/EP2020/064602 dated Aug. 17, 2020 with English translation (six (6) pages).
German-language Written Opinion (PCT/ISA/237) issued in PCT Application No. PCT/EP2020/064602 dated Aug. 17, 2020 (eight (8) pages).
"Fahren mit TIPTRONIC | So wirds gemacht", May 12, 2018, Retrieved from the Internet: https://www.youtube.com/watch?v=kRdWtOm021E (retrieved on Jul. 30, 2020) XP054980731.
Chinese-language Office Action issued in Chinese Application No. 202080046875.9 dated Sep. 22, 2022 with English translation (25 pages).

* cited by examiner

GEARBOX SYSTEM WITH AN AUTOMATED MANUAL GEARBOX

BACKGROUND AND SUMMARY OF THE INVENTION

The invention relates to a gearbox system having an automated manual gearbox, a gearbox control device, configured to control the automated manual gearbox, and a monostable toggle switch actuatable by a user, which is movable in at least, in particular exactly, two deflection directions and by means of which a plurality of driving levels of the gearbox control device are selectable by a driver.

Document EP 1 045 172 B1 relates to a motor vehicle having a drive motor and an automatically shifted gearbox, in particular an automatic gearbox, and having an operating lever as an operating element. Using this lever, a driver activates an electrical gearbox control device, which controls the automatically shifted gearbox in dependence on an operating position selected at the selection lever for the automatically shifted gearbox and on other operating parameters of the motor vehicle, wherein specific operating settings of the automatically shifted gearbox are selected by deflecting the selection lever, and this lever is movable along at least one gearshift gate in at least two deflection directions to preselect individual driving levels in the automatic operation and always automatically resets to the same starting position from the two deflection directions. Each deflection direction of the selection lever in the gearshift gate to preselect individual driving levels in the automatic operation is assigned the same driving level of the automatically shifted gearbox, and two different driving levels can be selected in at least one deflection direction of the selection lever, in that the selection lever is movable by a first distance up to a first stop in the deflection direction to select a first driving level and the selection lever is movable a second, greater distance up to a second stop in the same deflection direction to select a second driving level, wherein the first stop can be overcome.

With new vehicle generations, further driving levels are added in automated manual gearboxes, in the past, for example, a manual selection of the gears (M), using which automatic shift processes of the gearbox can be manually initiated. Such additional shifting modes have to be comprehensible and shiftable for a driver and integrated into existing shifting options.

It is an object of the invention to provide an improved gearbox system having an automated manual gearbox and a method and gearbox control device for operating such a gearbox system. In particular, it is an object of the invention to simplify operation of a gearbox system having a plurality of driving levels.

This object is achieved by a gearbox system, a vehicle having such a gearbox system, and a method and gearbox control device for operating such a gearbox system according to the independent claims. Advantageous embodiments are claimed in the dependent claims.

A first aspect of the invention relates to a gearbox system which has an automated manual gearbox. A gearbox control device of this gearbox system is configured to control the automated manual gearbox. The gearbox system preferably furthermore has a monostable toggle switch actuatable by a user, which is movable in at least, in particular exactly, two deflection directions and by means of which a plurality of driving levels of the gearbox control device are selectable by a driver. Furthermore, the gearbox system preferably has a visual device, which graphically displays or can graphically display a gearshift diagram having driving levels selectable by the toggle switch. The gearbox control device preferably has a further driving level which is not selectable by means of the toggle switch but can be exited by moving the toggle switch in at least one of the two deflection directions. The visual device preferably has at least one display, configured to display a symbol which indicates the at least one deflection direction of the toggle switch, by which the further driving level can be exited. The gearbox control device is preferably furthermore configured to control the at least one display in such a manner that the symbol is displayed when the further driving level is selected.

A second aspect of the invention relates to a vehicle having such a gearbox system.

A third aspect of the invention relates to a method for operating such a gearbox system, wherein the symbol is displayed when the further driving level is selected.

A driving level in the meaning of the invention preferably corresponds to an operating mode of the automated manual gearbox. The driving level is further preferably defined in the gearbox control device here.

A visual device in the meaning of the invention is configured to graphically display a gearshift diagram of the automated manual gearbox. The gearshift diagram is preferably applied unchangeably to a surface in the region of the monostable toggle switch. Further preferably, however, the gearshift diagram can also be graphically displayed on the at least one display and is changeable in particular in this case.

The invention is based on the approach of nonetheless being able to return from a further driving level, which is not part of a gearshift gate having driving levels selectable by the monostable toggle switch, by a movement of the monostable toggle switch back to one of the driving levels of the gearshift gate which are selectable by the monostable toggle switch.

Such a further driving level can be selected here either without an input of the user or driver by the gearbox control device itself or can also be initiated by such an input of the driver. According to the invention, this further driving level can always be exited by an actuation of the monostable toggle switch. In this way, a simple and intuitive manner of exiting the further driving level is implemented. Moreover, the user or driver can always have experience from the displayed symbol which driving level, also of driving levels outside the gearshift gate, is selected and how it can be exited. In addition, the invention offers the possibility of providing a large number of further driving levels, which can be integrated by the teaching according to the invention in existing shifting sequences of gearbox systems.

In one advantageous embodiment of the gearbox system, it furthermore has a first switch actuatable by the user, in particular a paddle, by means of which the further driving level is selectable, which is not selectable by means of the toggle switch.

The invention is particularly advantageous in those gearboxes which have further switches to select the further driving level or driving levels. For example, an automated manual gearbox in the driving level of manual operation, i.e., after a manual gear is engaged, is no longer in a continuous operating mode. These continuous operating modes typically correspond to the driving levels of the gearshift gate of the monostable toggle switch. The driving level of manual operation is therefore also not shown in the gearshift diagram for the monostable toggle switch.

This further driving level of manual operation, which can be in particular selected by a so-called paddle on the steering wheel and in which individual manual gears can also be engaged by means of the paddle, can be exited again according to the invention by an actuation of the monostable toggle switch. Secure and comfortable exiting of the further driving level can be ensured in this way, without a further operating element having to be provided. The actuation by the monostable toggle switch is particularly intuitive for a user here, particularly because the display of the visual device indicates to the user the at least one deflection direction of the toggle switch by means of which the further driving level can be exited again.

In a further advantageous embodiment of the gearbox system, the symbol indicates the at least one deflection direction of the toggle switch, in particular by means of a triangle or an arrow, the tip of which points in the at least one deflection direction. In this way, it is conveyed to a user in a particularly intuitive manner which selection options he has starting from the selected further driving level.

In a further advantageous embodiment of the gearbox system, the toggle switch is movable along a gearshift gate which is indicated by the gearshift diagram, wherein the two deflection directions are at least essentially parallel to the gearshift gate. A particularly intuitive operation of the monostable toggle switch may also be implemented in this way.

In a further advantageous embodiment of the gearbox system, the toggle switch is designed in such a manner that it cannot be enclosed with the hand. Monostable toggle switches may be implemented by this measure which occupy substantially less space in relation to a classic selection lever and also do not protrude into the interior of the vehicle or project above a console of the vehicle.

In a further advantageous embodiment of the gearbox system, the toggle switch has at least one bar and/or a ribbing, which extends or extend at least essentially perpendicular to one of the at least two deflection directions, and by means of which the driver can operate the toggle switch. A bar which is preferably provided with a ribbing or also only a ribbing represents a particularly space-saving variant of a monostable toggle switch.

In a further advantageous embodiment, the display is a panel that can be backlit or an electronic panel. In the case of the panel that can be backlit, the symbol is displayed by activating the light function. In the case of an electronic display, the display takes place by way of appearance of the symbol on the electronic display.

In a further advantageous embodiment of the gearbox system, the gearshift diagram is a part of the display. The gearshift diagram is thus displayed on the display.

In a further advantageous embodiment of the gearbox system, the gearshift diagram is a fixed graphic representation.

In a further advantageous embodiment of the gearbox system, at least four driving levels, preferably five driving levels can be selected using the toggle switch.

In a further advantageous embodiment of the gearbox system, the further driving level is a manual driving level, using which gears of the automated manual gearbox can be selected by the driver himself.

In a further advantageous embodiment, the gearbox system has a further display, wherein the selected gear in the further driving level is displayed when the further driving level is selected. The user can check by way of the further display whether the further driving level of the automated manual gearbox is selected, and which gear of this further driving level is selected. In particular if the last shifting process is a long time ago, such a display is very helpful to remind the driver which driving level and/or which gear are selected.

In a further advantageous embodiment of the gearbox system, the further driving level is arranged in the gearshift gate between the driving levels neutral and drive, wherein the gearbox control device is furthermore configured to shift from the further driving level into the driving level neutral or drive depending on the orientation of the toggle switch. In particular the option of shifting from one driving level of the manual selection of the gears as the further driving level into the driving level neutral is of interest for drivers having a sporty style of driving. In extreme driving situations, the load can be taken from the output in this manner.

In a further advantageous embodiment, the gearbox system furthermore has a further second switch actuatable by the user, by means of which a driving level parking brake function can be activated, which is independent of the toggle switch and/or the first switch. In this way the driving level parking brake function can be separated from the driving levels of the continuous operating modes and from the further driving level.

In a further advantageous embodiment of the gearbox system, the display is furthermore configured to display which driving level is selected, and the gearbox control device is furthermore configured to control the display in such a manner that the respectively selected driving level is displayed. In this way, the driver can perceive in a particularly simple manner in which driving level the automated manual gearbox of his vehicle is operated.

The abovementioned features and advantages with respect to the gearbox system according to the first aspect of the invention also apply accordingly for the other aspects of the invention and vice versa.

In one advantageous embodiment of the vehicle, the bar protrudes at most approximately 3 cm, preferably approximately 2 cm, beyond a console of the vehicle.

In a further advantageous embodiment of the vehicle, the first switch is arranged spatially separated from the toggle switch, wherein the first switch is preferably arranged on a steering wheel or on a steering column and/or the toggle switch is arranged on a center console.

In one advantageous embodiment of the method, the visual device graphically displays a gearshift diagram having driving levels selectable by the toggle switch when the gearbox system is activated.

In a further advantageous embodiment of the method, the further driving level is selected when the first switch is actuated.

Further features and advantages of the invention result from the following description of exemplary embodiments in conjunction with the figures.

DETAILED DESCRIPTION OF THE DRAWINGS

Figure 1:
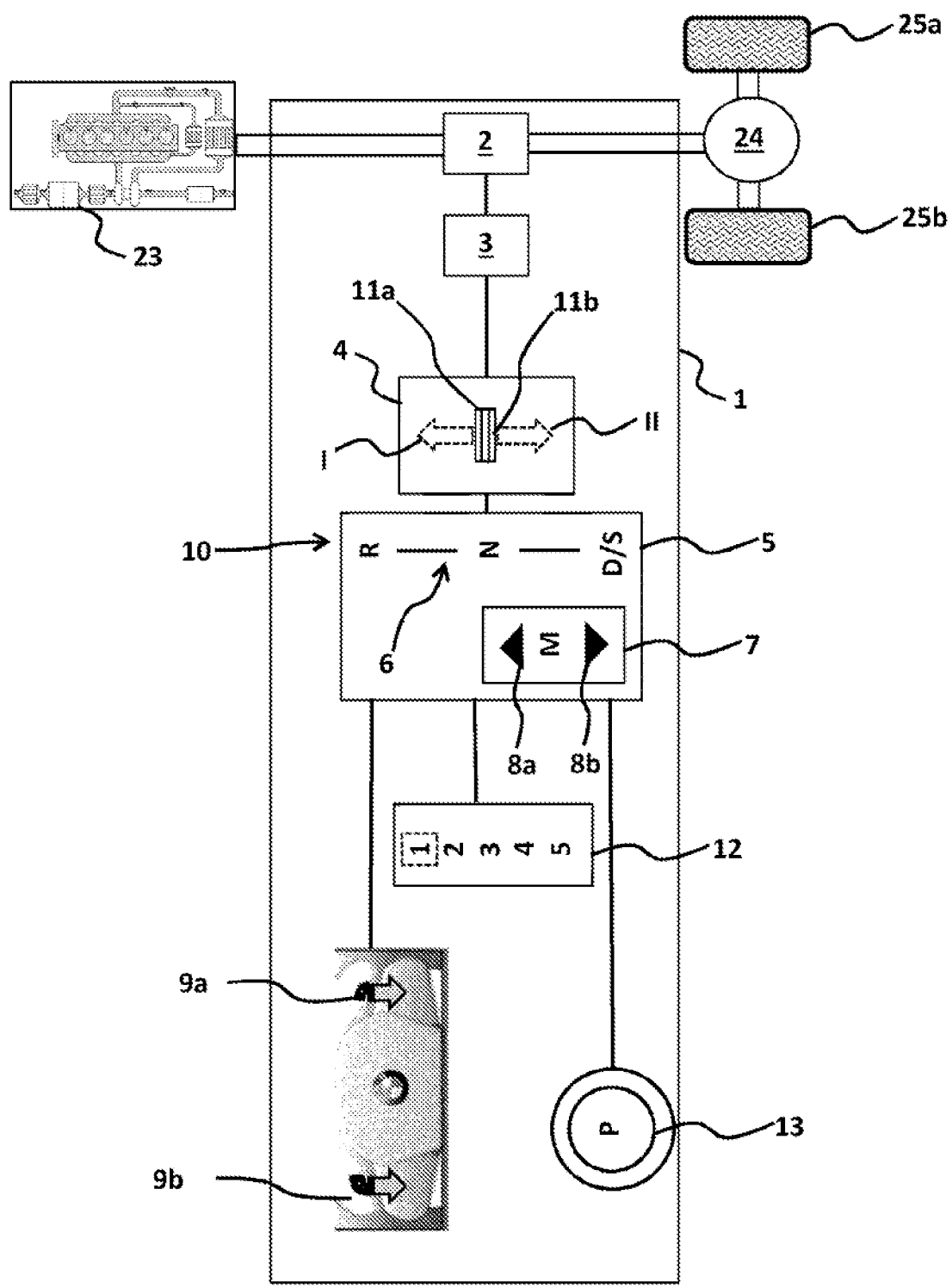
FIG. 1 shows an exemplary embodiment of a gearbox system of a vehicle.

FIG. 1 shows an exemplary embodiment of the gearbox system 1, which is arranged in a vehicle between a motor 23 and the output. The output comprises a differential 24 and two wheels 25a and 25b here.

The gearbox system 1 has an automated manual gearbox 2, as is known in the prior art. In particular, gearboxes having torque converter or also dual clutch gearboxes can be used as automated manual gearboxes.

The automated manual gearbox 2 is controlled by a gearbox control device 3. In particular, the shifting time and the gear to be engaged, i.e., the desired transmission ratio, are defined by means of the gearbox control device 3. This is preferably carried out on the basis of characteristic maps which determine the transmission ratio to be implemented depending on the operating point and depending on the requirement.

Characteristic maps are preferably used for this purpose which are stored in the gearbox control device 3 or a database of the gearbox control device 3.

The operating mode of the gearbox control device 3 can be selected by means of a monostable toggle switch 4.

In the illustrated exemplary embodiment, the monostable toggle switch 4 has two deflection directions I, II in opposite directions, which are each indicated by means of a dashed arrow. The actual gearshift element to be actuated by hand by a user or driver is a bar 11a, which is preferably provided with a ribbing 11b. This bar 11a is moved in the first deflection direction I or in the second deflection direction II by the user.

The monostable toggle switch has a stable center position of the gearshift element or the bar 11a.

The continuous operating modes of the automated manual gearbox 2 can preferably be selected by means of the monostable toggle switch 4. For this purpose, these continuous operating modes are set by means of the monostable toggle switch 4 in the gearbox control device 3 by means of so-called driving levels.

A gearbox system 1 according to the invention preferably has four continuous operating modes, which are indicated by the driving levels reverse gear R, idle or neutral N, and the driving level drive D and also the driving level sport S. These four driving levels correspond to the typical driving levels of an automated manual gearbox. In general, a further operating mode of the automated manual gearbox is added for parking P.

The driving levels R, N, D, S, which indicate the continuous operating modes of the automated manual gearbox 2, form a gearshift diagram 6. The driving levels R, N, D, S or the gearshift diagram 6 is/are preferably arranged as a fixed graphic representation of a visual device in the spatial region of the monostable toggle switch 4. The driving levels R, N, D, S preferably form a so-called gearshift gate 10 here.

The deflection directions I, II of the toggle switch 4 are preferably oriented in parallel to the gearshift gate 10 here. In this way, it is intuitively clear to the user or driver in which direction he has to move the gearshift element IIa of the monostable toggle switch 4 to move from a presently selected driving level to another driving level in the gearshift gate 10.

The representation of the driving levels R, N, D, S is preferably a part of a visual device 5. Further preferably, this visual device 5 has a display 7. This display can be embodied as a digital display, in particular as a so-called LCD display, or also as a display having panels that can be backlit.

The visual device 5 and the monostable toggle switch 4 are preferably arranged in the region of the center console of a vehicle.

One symbol M or multiple symbols can preferably be displayed in this display 7, which identifies or identify the presence of a further operating mode of the automated manual gearbox 2. In the present case, the further operating mode is not a continuous operating mode, but rather a manual operation of the automated manual gearbox 2. In this operation, the actual shifting process is also controlled by the gearbox control device 3, but the time or the operating point at which the shifting between individual gears or transmission ratios of the automated manual gearbox 2 is changed or modified is determined by the user or driver by a manual actuation. If the driving level M for this manual operating mode is selected by the user or driver, the symbol M therefore preferably appears in the display 7.

To reach or select the further driving level M, the gearbox system 1 shown in the exemplary embodiment has a further first switch, which is formed by two so-called paddles 9a, 9b, which are arranged on a steering column of the steering wheel of the vehicle having the low system 1.

If one of the paddles 9a, 9b, as indicated by the arrows, is pulled, the gearbox controller 3 changes into the driving level M of the manual operating mode of the automated manual gearbox 2.

In this driving level M, depending on whether the right paddle 9a or the left paddle 9b is actuated, a gear change to a higher transmission ratio, i.e., a higher gear, or to a lower transmission ratio, i.e., a lower gear, 1, 2, 3, 4, 5, can then take place. The manually selected transmission ratio or the manually selected gear is preferably displayed in a further, second display 12. This second display 12 is preferably arranged for the driver in the field of view of the driver, for example, in the dashboard. For example, the selected gear, as shown in FIG. 1, can be enclosed by a border.

As results from the preceding explanation of the driving level M, this further driving level M is exclusively selectable via the paddles 9a, 9b of the further first switch. Selecting by means of the monostable toggle switch 4, in contrast, is not possible. To exit the driving level M, in contrast, an actuation of the monostable toggle switch 4 is in turn necessary.

In order that the user or the driver knows into which driving levels R, N, D, S of the gearshift gate 10 he can return by means of the monostable toggle switch, preferably further symbols 8a, 8b, in particular, as shown in the exemplary embodiment, arrow tips or triangles, are displayed in the display 7, which indicate in which direction the monostable toggle switch 4 can be actuated to leave the driving level M. It is also displayed to the user or driver by the arrangement of the display 7 shown in the exemplary embodiment which driving level R, N, D, S of the gearshift gate he can reach by a movement in the first deflection direction I, namely the driving level N, or by a movement in the second deflection direction II, namely the driving level D, R.

Preferably, a further second switch 13 actuatable by the user is present for selecting the operating mode P.

Figure 2:
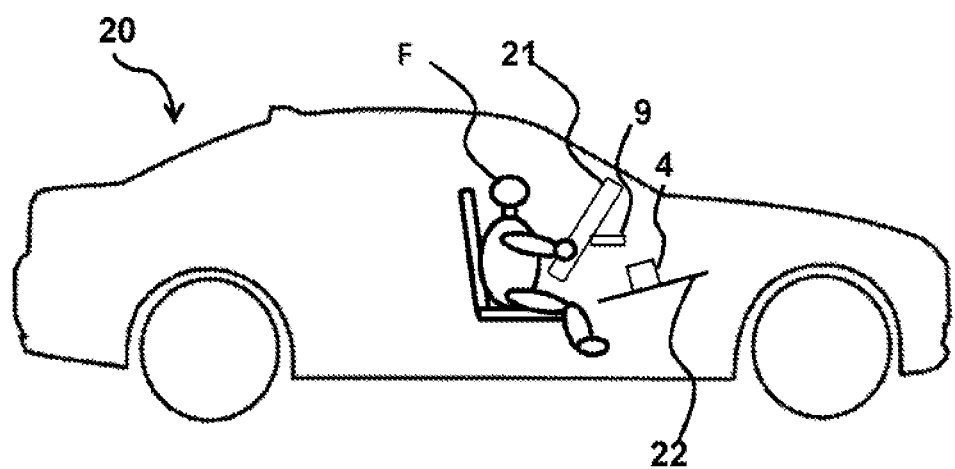
FIG. 2 shows an exemplary embodiment of a vehicle having a gearbox system.

FIG. 2 shows an exemplary embodiment of a vehicle 20 in which a gearbox system 1 according to FIG. 1 is installed.

As shown in FIG. 2, the first switch 9a, 9b is preferably arranged in the region of the steering wheel 21 of the vehicle 20. In this way, the user or driver F can actuate the paddles 9a, 9b without taking the hand from the steering wheel 21.

The monostable toggle switch 4, which is used to select the driving levels R, N, D, S, thus the continuous operating modes, of the automated manual gearbox 2, has to be actuated significantly more rarely in the driving level M, in contrast to the paddles 9a, 9b. It is therefore preferably arranged at another point in the vehicle, for example, in the region of the center console 22.

The exemplary embodiments indicated above merely represent exemplary implementations which do not restrict the scope of protection, which is defined by the claims and statements equivalent thereto.

LIST OF REFERENCE SIGNS 1 gearbox system
2 manual gearbox
3 gearbox control device
4 monostable toggle switch
5 visual device
6 gearshift diagram
7 display
8a, 8b symbol
9a, 9b first switch
10 gearshift gate
11a bar
11b ribbing
12 further display
13 second switch
20 vehicle
21 steering wheel
22 center console
23 motor
24 differential
25a, 25b wheels
R driving level reverse gear
N driving level neutral
D driving level drive
S driving level sport
M driving level manual
F driver/user

What is claimed is:

1. A gearbox system for a vehicle, comprising:
an automated manual gearbox;
a gearbox controller configured to control the automated manual gearbox;
a user-actuable monostable toggle switch which is movable in exactly two deflection directions for selection of at least one of a plurality of driving levels of the gearbox controller; and
a visual device configured to graphically display a gearshift diagram having driving levels selectable by the toggle switch;
wherein
the gearbox controller has a further driving level which is not selectable using the toggle switch,
when the further driving level is selected, moving the toggle switch in at least one of the two deflection directions causes the further driving level to be exited,
the visual device has at least one display configured to display a symbol which indicates the at least one deflection direction of the toggle switch which will cause the further driving level to be exited,
the gearbox controller configured to control the at least one display such that the symbol is only displayed when the further driving level is selected,
the further driving level is arranged in a gearshift gate between driving levels neutral and drive, and
the gearbox controller is configured to shift from the further driving level into the driving level neutral or the driving level drive depending on which of the two deflection directions the toggle switch is moved.

2. The gearbox system according to claim 1, further comprising:
a first switch configured to be actuated by a user to select the further driving level which is not selectable by the toggle switch.

3. The gearbox system according to claim 1, wherein
the toggle switch has one or both of at least one bar and a ribbing usable by a user to actuate the toggle switch, and
the one or both of at least one bar and the ribbing extends at least essentially perpendicular to one of the at least two deflection directions and by means of which the user can operate the toggle switch.

4. The gearbox system according claim 1, further comprising:
a further display configured to display a selected gear when the further driving level is selected.

5. The gearbox system according to claim 1, wherein
the display is configured to display which driving level is selected, and
the gearbox controller is configured to control the display to display which driving level is selected.

6. A vehicle having the gearbox system as claimed in claim 1.

7. The vehicle according to claim 6, wherein
the toggle switch has one or both of at least one bar and a ribbing usable by a user to actuate the toggle switch,
the one or both of at least one bar and the ribbing extends at least essentially perpendicular to one of the at least two deflection directions and by means of which the user can operate the toggle switch, and
the at least one bar protrudes at most 3 cm beyond a console of the vehicle.

8. The vehicle according to claim 7, further comprising:
a first switch configured to be actuated by the user to select the further driving level which is not selectable by the toggle switch,
wherein
the first switch is arranged spatially separated from the toggle switch, and
either the first switch is arranged on a steering wheel or a steering column, or the toggle switch is arranged on a center console, or the first switch is arranged on the steering wheel or the steering column and the toggle switch is arranged on the center console.

9. The vehicle according to claim 8, wherein
the visual device graphically displays the gearshift diagram with driving levels selectable by the toggle switch when the gearbox system is activated.

10. The vehicle according to claim 8, wherein
the further driving level is selected when the first switch is actuated.

11. The vehicle according to claim 6, further comprising:
a first switch configured to be actuated by a user to select the further driving level which is not selectable by the toggle switch,
wherein
the first switch is arranged spatially separated from the toggle switch, and
either the first switch is arranged on a steering wheel or a steering column, or the toggle switch is arranged on a center console, or the first switch is arranged on the steering wheel or the steering column and the toggle switch is arranged on the center console.

12. The vehicle according to claim 11, wherein
the further driving level is selected when the first switch is actuated.

13. A gearbox controller configured to control an automated manual gearbox of a vehicle, wherein the gearbox controller is configured
- to receive gearbox control signals from a monostable toggle switch actuatable by a user in exactly two deflection directions to select among a plurality of driving levels of the gearbox controller,
- to output signals to a visual device for graphically display of a gearshift diagram having driving levels selectable by the toggle switch;

the gearbox controller has a further driving level which is not selectable by the toggle switch, in response to movement of the toggle switch in one of the two deflection directions when the further driving level is selected, the gearbox controller causes the further driving level to be exited, the visual device has at least one display configured to display a symbol which indicates the one of the two deflection directions of the toggle switch which will result in the further driving level being exited, the gearbox controller is configured to control the at least one display to only display the symbol when the further driving level is selected, the further driving level is arranged in a gearshift gate between driving levels neutral and drive, and the gearbox controller is configured to shift from the further driving level into the driving level neutral or the driving level drive depending on which of the two deflection directions the toggle switch is moved.

14. A gearbox system for a vehicle, comprising:

a gearbox controller configured to control an automated manual gearbox;

a user-actuable monostable toggle switch which is movable in exactly two deflection directions for selection of at least one of a plurality of driving levels of the gearbox controller; and a visual device configured to graphically display a gearshift diagram having driving levels selectable by the toggle switch;

wherein the gearbox controller has a further driving level which is not selectable using the toggle switch, when the further driving level is selected, moving the toggle switch in at least one of the two deflection directions causes the further driving level to be exited, the further driving level is arranged in a gearshift gate between driving levels neutral and drive, and the gearbox controller is configured to shift from the further driving level into the driving level neutral or the driving level drive depending on which of the two deflection directions the toggle switch is moved.

* * * * *